United States Patent [19]
Middleton

[11] Patent Number: 6,007,071
[45] Date of Patent: Dec. 28, 1999

[54] CHUCK WITH LOCKING BODY

[75] Inventor: Ian Middleton, Chesterfield, United Kingdom

[73] Assignee: Power Tool Holders Incorporated, Wilmington, Del.

[21] Appl. No.: 09/037,116

[22] Filed: Mar. 9, 1998

[51] Int. Cl.⁶ .................................................. B23B 31/12
[52] U.S. Cl. ............................................ 279/62; 279/902
[58] Field of Search ................................ 279/902, 62, 60, 279/61, 125

[56] References Cited

U.S. PATENT DOCUMENTS

| | | |
|---|---|---|
| 1,985,242 | 12/1934 | DeBack . |
| 2,716,555 | 8/1955 | Rowe . |
| 3,237,955 | 3/1966 | McCarthy et al. . |
| 3,325,166 | 6/1967 | McCarthy et al. . |
| 3,506,277 | 4/1970 | Harms . |
| 3,545,776 | 12/1970 | Haviland . |
| 4,277,074 | 7/1981 | Kilberis . |
| 4,317,578 | 3/1982 | Welch . |
| 4,323,324 | 4/1982 | Eberhardt . |
| 4,358,230 | 11/1982 | Rohm . |
| 4,389,146 | 6/1983 | Coder . |
| 4,395,170 | 7/1983 | Clarey . |
| 4,460,296 | 7/1984 | Sivertson, Jr. . |
| 4,498,682 | 2/1985 | Glore . |
| 4,526,497 | 7/1985 | Hatfield . |
| 4,536,113 | 8/1985 | Hatfield . |
| 4,563,013 | 1/1986 | Hunger et al. . |
| 4,669,932 | 6/1987 | Hartley . |
| 4,682,918 | 7/1987 | Palm . |
| 4,915,555 | 4/1990 | Smothers . |
| 4,958,840 | 9/1990 | Palm . |
| 4,968,191 | 11/1990 | Palm . |
| 5,011,343 | 4/1991 | Saban et al. . |
| 5,145,192 | 9/1992 | Rohm ........................................ 279/62 |
| 5,531,549 | 7/1996 | Fossella . |
| 5,624,125 | 4/1997 | Rohm . |
| 5,820,136 | 10/1998 | Han et al. .............................. 279/131 |

FOREIGN PATENT DOCUMENTS

WO 8911368  11/1989  WIPO .

*Primary Examiner*—Steven C. Bishop
*Attorney, Agent, or Firm*—Dority & Manning, P.A.

[57] ABSTRACT

A chuck for use with a manual or powered driver having a housing and a drive shaft rotatable with respect to the housing is provided. The chuck includes a generally cylindrical body having a forward section and a rearward section. The rearward section has an axial bore formed therein to mate with the drive shaft of the driver. A generally cylindrical sleeve is received over the body so that the sleeve is rotatable relative to the body. A gripping mechanism is actuatable to a closed position in which the gripping mechanism axially and rotationally retains a tool with respect to the body and to an open position in which the gripping mechanism does not so retain the tool. The gripping mechanism is in communication with the body and the sleeve so that relative rotation between the body and the sleeve actuates the gripping mechanism to one of the closed and open positions, depending on the direction of the relative rotation between the body and the sleeve. A locking mechanism is configured to selectively rotationally fix the body to the housing so that the relative rotation between the body and the housing is prevented while the sleeve is rotated relative to the body.

32 Claims, 4 Drawing Sheets

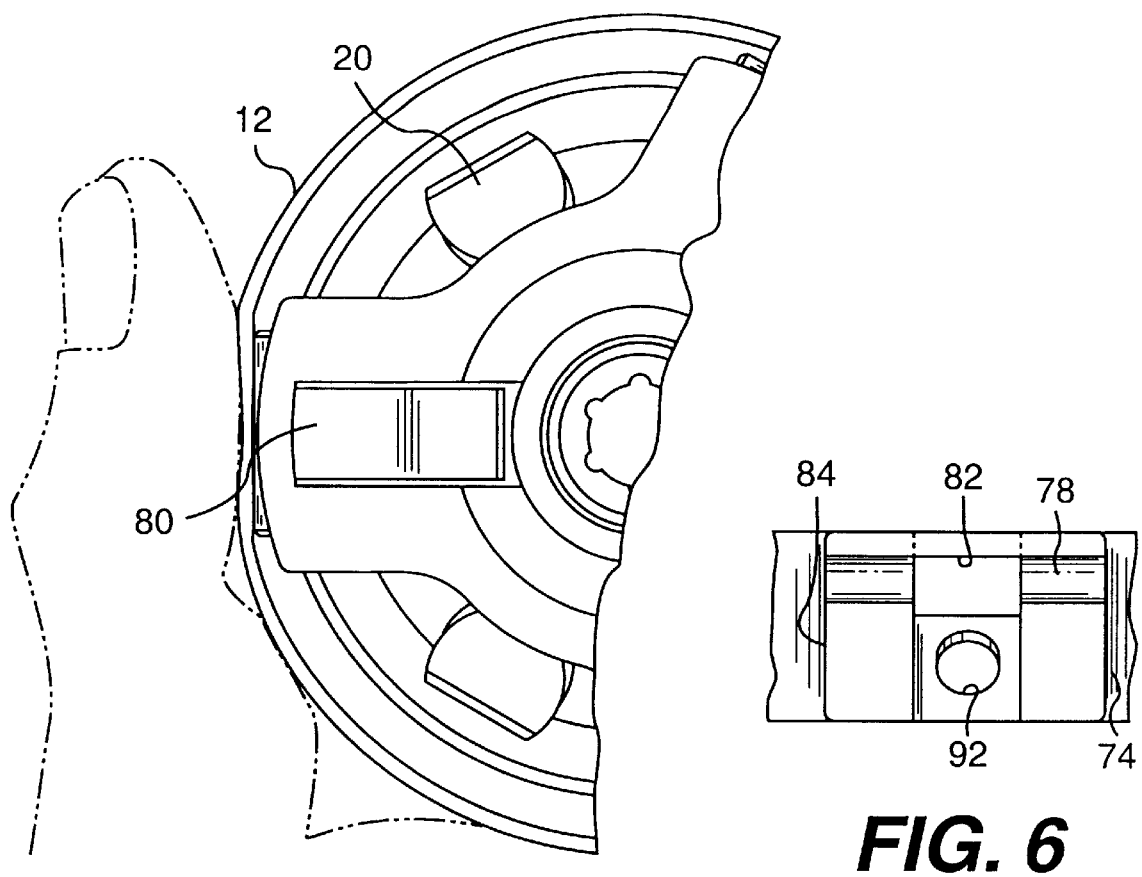
FIG. 3B
FIG. 6
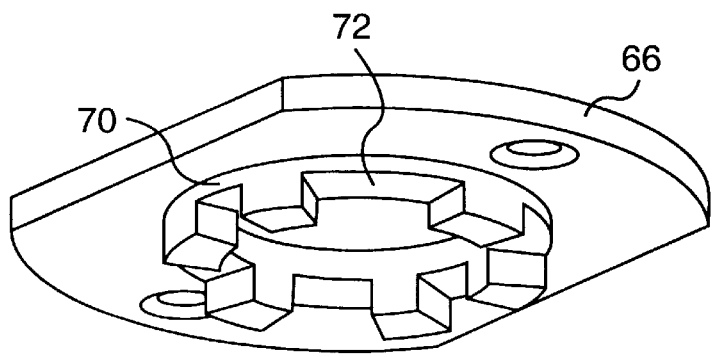
FIG. 4

CHUCK WITH LOCKING BODY

BACKGROUND OF THE INVENTION

The present invention relates generally to chucks for use with drills or with electric or pneumatic power drivers. More particularly, the present invention relates to a chuck of the keyless type which may be tightened or loosened by hand.

Both hand and electrical or pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore or any other suitable means.

A variety of chuck types have been developed in which a gripping mechanism is actuated by relative rotation between a chuck body and a sleeve. In an oblique jawed chuck, for example, a body member includes three passageways disposed approximately 1200 apart from each other. The passageways are configured so that their center lines meet at a point along the chuck axis forward of the chuck body. The gripping mechanism includes three jaws constrained by and moveable in the passageways to grip a cylindrical tool shank disposed approximately along the chuck center axis. The gripping mechanism also includes a nut which rotates about the chuck center and which engages threads on the jaws so that rotation of the nut moves the jaws in either direction in the passageways. The body is attached to the drive shaft of a driver and is configured so that rotation of the body in one direction with respect to the nut forces the jaws into gripping relationship with the tool shank, while rotation in the opposite direction releases the gripping relationship. Such a chuck may be keyless if it is rotated by hand. One example of such a chuck is disclosed in U.S. Pat. No. 5,125,673 entitled "Non-Impact Keyless Chuck," commonly assigned to the present assignee and the entire disclosure of which is incorporated by reference herein. Various configurations of keyless chucks are known in the art and are desirable for a variety of applications.

Keyless chucks actuated by relative rotation between a sleeve and a chuck body include means to control the rotational position of the sleeve and the body. For example, a first sleeve may be provided in communication with a nut as described above while a second sleeve, which is independent of the first sleeve, may be attached to the body. Thus, a user may rotate the first sleeve with one hand while gripping the second sleeve with the other hand, thereby holding the body still. Alternatively, in some devices in which only a single sleeve is provided, a user may grip the single sleeve and actuate the tool driver to rotate the spindle, thereby rotating the chuck body with respect to the sleeve. In addition a mechanism may be located in the driver to lock the spindle of the driver when the driver is not actuated, thus enabling use of single sleeve chuck.

SUMMARY OF THE INVENTION

The present invention recognizes and addresses the foregoing considerations, and others, of prior art constructions and methods.

Accordingly, it is an object of the present invention to provide an improved chuck.

It is another object of the present invention to provide a chuck having a body, a sleeve, and a gripping mechanism actuated by relative rotation of the body and sleeve, where the body may be locked to the tool driver housing)when the sleeve is rotated by hand.

It is another object of the present invention to provide a chuck and driver arrangement where an actuatable member is selectively extendable between the two to facilitate use of the chuck.

These and other objects are achieved by a chuck for use with a manual or powered driver having a housing and a drive shaft rotatable with respect to the housing. The chuck comprises a generally cylindrical body having a forward section and a rearward section. The rearward section has an axial bore formed therein to mate with the drive shaft of the driver. A generally cylindrical sleeve is received over the body so that the sleeve is rotatable relative to the body. A gripping mechanism is actuatable to a closed position in which the gripping mechanism axially and rotationally retains a tool with respect to the body and to an open position in which the gripping mechanism does not so retain a tool. The gripping mechanism is in communication with the body and the sleeve so that relative rotation between the body and the sleeve actuates the gripping mechanism to one of the closed position and the open position, depending on the direction of the relative rotation between the body and the sleeve. A locking mechanism is configured to selectively rotationally fix the body to the housing so that relative rotation between the body and the housing is prevented while the sleeve is rotated relative to the body.

Other objects, features and aspects of the present invention are discussed in greater detail below.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which:

FIG. 3B is a partial rear view of a chuck in accordance with an embodiment of the present invention;

FIG. 4 is a perspective view of a plate of a chuck in accordance with an embodiment of the present invention for attachment to the driver housing including receiving gaps for a locking member;

Figure 1:
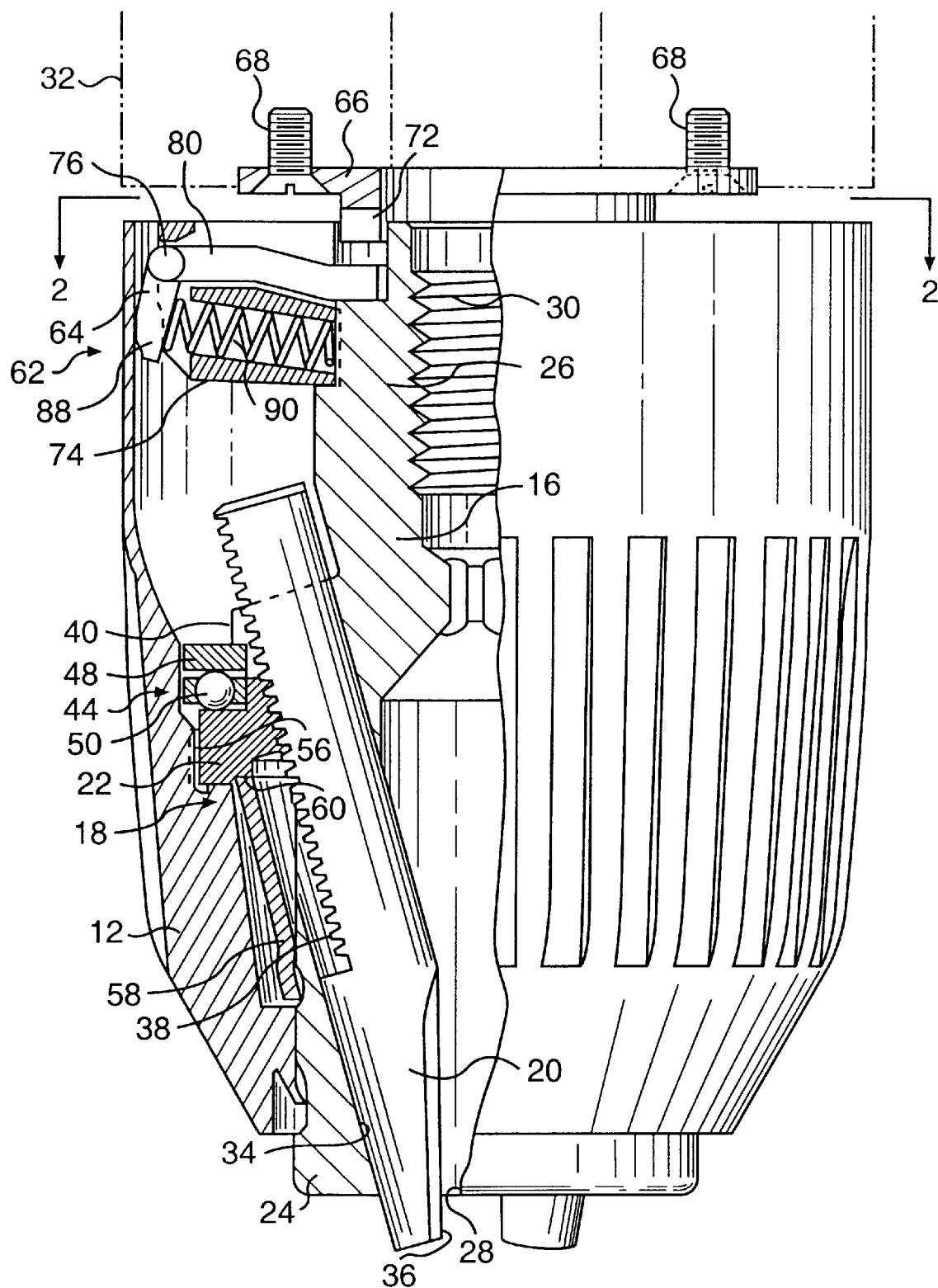
FIG. 1 is a longitudinal view, partly in section, of a chuck in accordance with an embodiment of the present invention.

Repeat use of reference characters in the present specification and drawings is intended to represent the same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and there equivalents.

Referring to the figures, a presently preferred embodiment of the present invention is illustrated in the form of an oblique jawed chuck. It should be understood, however, that this illustration is provided by way of explanation of the invention only and that the invention is applicable to any suitable chuck in which a gripping mechanism is actuated through relative rotation of a sleeve and a chuck body. Referring to FIG. 1, a chuck 10 includes a sleeve 12, a body 16 and a gripping mechanism 18. In this embodiment, gripping mechanism 18 includes jaws 20 and a nut 22.

Body 16 is generally cylindrical in shape and comprises a nose or forward section 24 and a tail or rearward section 26. An axial bore 28 is formed in the nose section 24. Axial bore 28 is dimensioned somewhat larger than the largest tool shank that the chuck is designed to accommodate. A threaded bore 30 is formed in tail section 26 and is of a standard size to mate with the drive shaft of a powered or hand driver, for example a power drill having a spindle (indicated in phantom in FIGS. 1 and 5 at 32 and 33, respectively). The bores 28 and 30 may communicate at a central region of body 16. While a threaded bore 30 is illustrated, such bore could be replaced with a tapered bore of a standard size to mate with a tapered drive shaft or with any other suitable connection mechanism.

Passageways 34 are formed in body 16 to accommodate each jaw 20. Three jaws 20 are employed, and each jaw is separated from the adjacent jaw by a arc of approximately 120°. The axes of the passageways 34 and the jaws 20 are angled with respect to the chuck axis and intersect the chuck axis at a common point ahead of chuck body 16. Each jaw 20 has a tool engaging portion 36, which is generally parallel to the axis of chuck body 16, and threads 38 on its opposite or outer surface. Threads 38 may be constructed in any suitable type and pitch.

Figure 5:
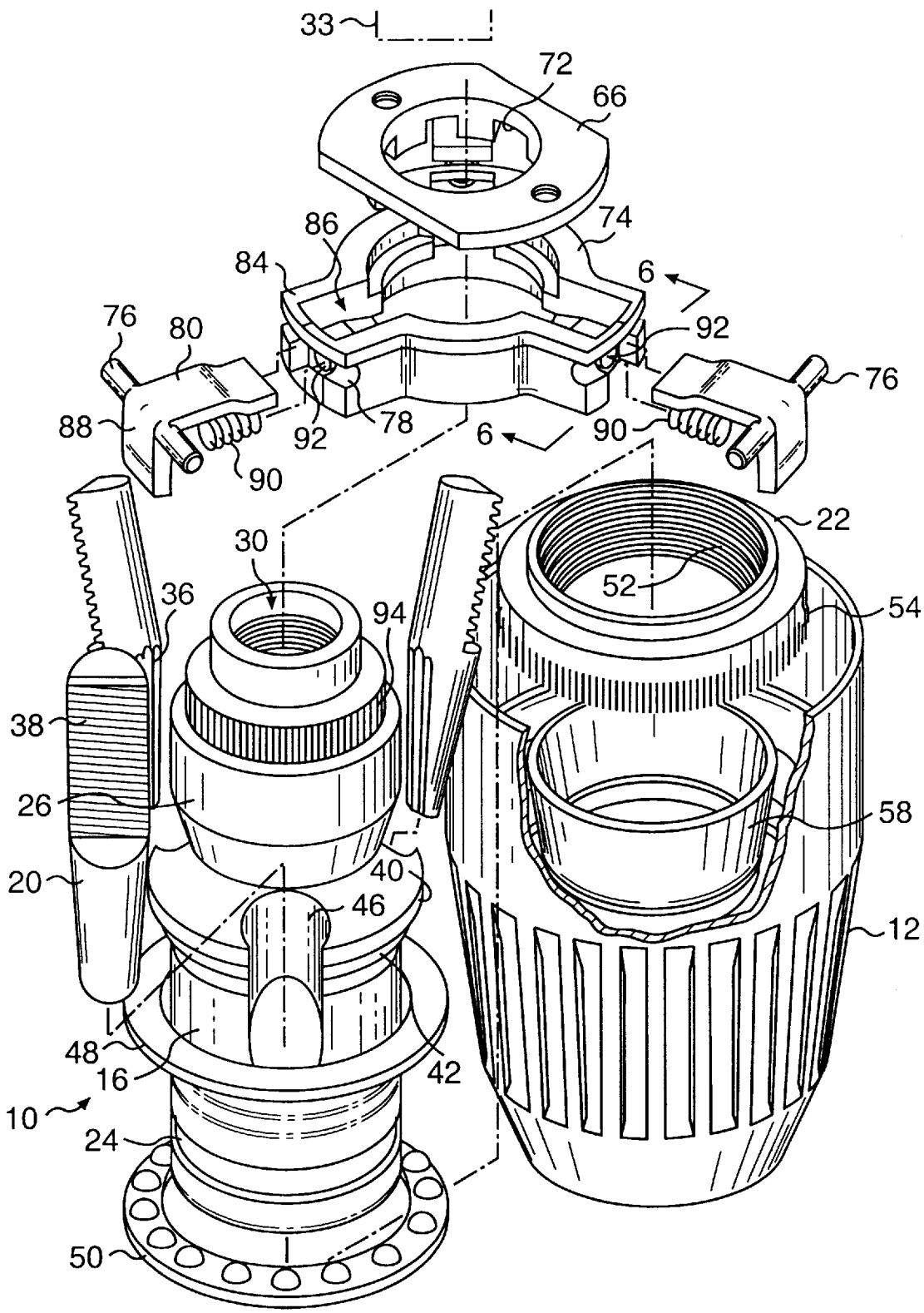
FIG. 5 is an exploded view of a chuck in accordance with an embodiment of the present invention; and, FIG. 6 is a partial plan view of a collar for securing a locking member of a chuck constructed in accordance with an embodiment of the present invention.

As illustrated in FIGS. 1 and 5, body 16 includes a thrust ring member 40 which, in a preferred embodiment, may be integral with the body. In an alternate embodiment, thrust ring 40 may be a separate component from the body member. Thrust ring 40 may also include a ledge portion 42 to receive a bearing assembly 44. Thrust ring 40 includes a plurality of jaw guideways 46 formed around the circumference to permit retraction of the jaws 20 therethrough. In the embodiment illustrated in FIGS. 1 and 5, bearing assembly 44 includes a washer 48 and caged roller bearing 50.

Nut 22 is a one piece nut which includes threads 52 for mating with threads 38 on jaws 20. Nut 22 is positioned about the body in engagement with the jaw threads so that when the nut is rotated with respect to body 16, the jaws will be advanced or retracted. The outer surface of nut 22 is knurled at 54 so that the nut may be pressed to sleeve 12 at 56.

The outer circumferential surface of sleeve 12 may be knurled or may be provided with longitudinal ribs or any other configuration to enable a user to grip it securely. The sleeve may be fabricated from a structural plastic such as polycarbonate, a filled polypropylene, for example glass filled polypropylene, or a blend of structural plastic materials. Other composite materials such as, for example, graphite filled polymerics may also be suitable in certain environments. In one embodiment, the sleeve is constructed from a 30% glass filled nylon 66 material. As would be appreciated by one skilled in the art, the materials for which the chuck of the present invention is fabricated will depend on the end use of the chuck, and the above are provided by way of example only.

In the embodiment of the invention illustrated in the figures, unitary sleeve 12 extends over substantially the entire length of the body, and its rear portion should be of a suitable thickness so that the sleeve is deformable upon application of pressure by a user's grip. In one exemplary embodiment, the rear portion of sleeve 12 has a thickness of approximately 0.026".

Sleeve 12 is axially secured with respect to the body by nut 22 which is maintained in place by retaining ring 58. Retaining ring 58 is an annular cone that is pressed onto forward section 24 of body 16 and that engages nut 22 at 60. Thus, cone 58 and nut 22 secure sleeve 12 in the axial direction with respect to the body.

Because sleeve 12 is rotationally fixed to nut 22, rotation of sleeve 12 with respect to body 16 also rotates nut 22 with respect to the body. Since jaws 20 are rotationally fixed with respect to the body within passageways 34, rotation of nut 22 moves jaws 20 axially through the passageways due to the engagement of the nut threads and jaw threads. The direction of axial movement of the jaws depends on the rotational direction of the sleeve and nut with respect to the body. If a tool, such as a drill bit, is inserted into bore 28, the sleeve and nut may be rotated so that jaws 20 move to a closed position wherein tool engaging portions 36 grippingly engage the tool. Rotation in the opposite direction moves the jaws axially rearward out of the closed position to an open position.

In a typical driver such as drill 32, spindle 33 is not locked in position unless the driver is activated. Because body 16 is secured to spindle 33 at bore 30, frictional forces in chuck 10 may cause the body and spindle to rotate with the sleeve when the chuck is open, thereby inhibiting relative rotation between the sleeve and the body and preventing effective operation of the chuck. Accordingly, in accordance with the present invention, a locking mechanism 62 is provided to rotationally fix body 16 to drill housing 32 during rotation of sleeve 12.

Figure 3A:
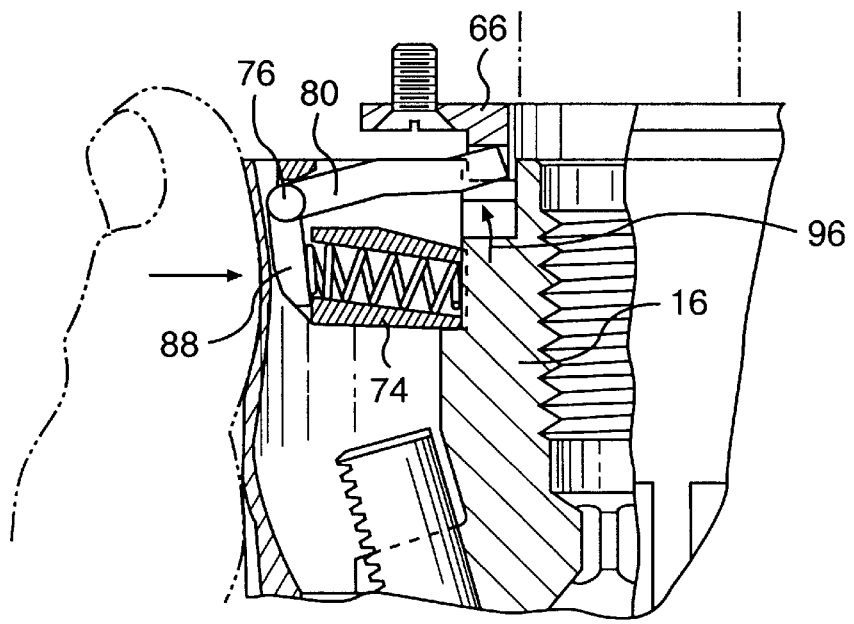
FIG. 3A is a partial longitudinal sectional view of a chuck in accordance with an embodiment of the present invention.

As discussed above, the rear portion of sleeve 12 is relatively thin and, as illustrated in FIG. 3A, deforms when a user's grip applies radially inward pressure to the sleeve. Accordingly, this radially inward pressure is transferred to an extendable member 64 so that it extends rearward from body 16 to engage a plate 66 secured to housing 32 by screws 68. As shown in FIG. 4, plate 66 includes a castled annular ring portion 70 defining gaps 72 into which extendable member 64 extends. As explained in more detail below, extendable member 64 is rotationally fixed with respect to body 16. Thus, insertion of member 64 into a gap 72 rotationally fixes body 16 with respect to housing 32 when a user grips sleeve 12.

Figure 2:
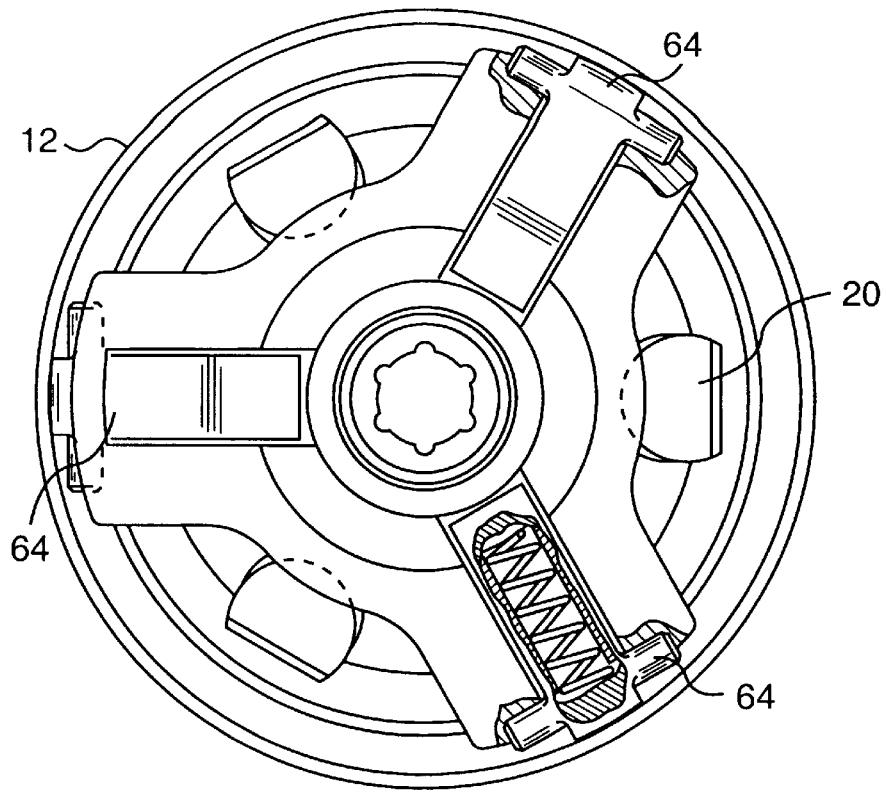
FIG. 2 is a rear view, partly in section, of a chuck in accordance with an embodiment of the present invention.

As shown in FIG. 2, three extendable members 64 are provided. Thus, when a user grips sleeve 12, one or more extendable members extend into a gap 72. A plurality of extendable members about the circumference of the body ensures that at least one extendable member engages housing 32, as shown in FIG. 3A, during rotation of the sleeve regardless of the position at which the user grips the sleeve. Accordingly, as a user grips and rotates sleeve 12, body 16 is rotationally locked to housing 32, thereby moving jaws 20 to an open or closed position depending on the direction of rotation.

A lubricant, for example DEFRIC PASTE M manufactured by Kawamura Laboratories, may be applied to either or both of the sleeve and the extendable members at the interface therebetween to reduce friction as the sleeve is rotated. Extendable members 64 are in one embodiment made from mild steel. It should be understood, however, that other suitable materials, such as diecast zinc or plastics, may also be used.

While three extendable members are illustrated in the figures, it should be understood that any suitable number may be employed. Moreover, it should also be understood that various suitable locking mechanisms are encompassed by the present invention, for example including various cam or lever mechanisms. Furthermore, while a sleeve actuated locking device is preferred, a locking mechanism may include a member actuated from the housing to extend from the housing to mate with the chuck body. In addition, as used herein, the housing of the driver is intended to include any portion of the driver that does not rotate with the spindle.

Referring again to FIGS. 1 and 5, locking mechanism 62 includes three extendable members 64 secured to rearward portion 26 of body 16 by a collar 74. In a preferred embodiment, collar 74 is constructed to resist a torque of at least 80 in-lbs and is made from a 30% glass filled nylon 66. Referring also to FIG. 6, each extendable member 64 includes lateral supports 76 which are received by a slot 78 in a radial extension 84 of collar 74 SO that extendable members 64 are pivotally mounted in the collar. First portions 80 of each extendable member are received by through slots 82 in the radial extensions. An opening 86 is provided in each radial extension 84 to permit first portions 80 to extend rearward from collar 74 into gaps 72 of plate 66. Gaps 72 are positioned with respect to radial extensions 84 and first portions 80 so that all first portions 80 may be simultaneously received by respective slots 72.

Extendable members 64 include second portions 88 biased radially outward to sleeve 12 by respective compression springs 90. Springs 90 are received in holes 92 of radial extensions 84 so that the springs are radially expandable with respect to body 16 between body 16 and second portion 88.

Collar 74 is pressed onto rear portion 26 of body 16 at knurled surface 94. Thus, collar 74 is axially and radially fixed with respect to the body. Since extendable members 64 are pivotally disposed but axially secured in grooves 78, coils 90 normally bias second portions 88 radially outward from the body to the sleeve so that the extendable members are maintained in a retracted position in which first portions 80 are disengaged from housing 32 and are substantially radially aligned with body 16. Because of the reduced thickness of sleeve 12 about rear portion 26 of body 16, however, radially inward pressure applied by a user's grip, as shown in FIGS. 3A and 3B, is transferred to the one or more second portions 88 to overcome the biasing effect of coils 90 so that first portions 80 extend rearward from body 16, as indicated by arrow 96, to engage the housing 32 by plate 66. Accordingly, by application of radially inward pressure, a user selectively locks the body to the drill housing so that the sleeve may be rotated with respect to the body.

While one or more preferred embodiments of the present invention are described above, it should be appreciated that various suitable embodiments are encompassed by the present invention. For example, the locking mechanism may include various devices for locking the body to the drill housing. Furthermore, where a biasing mechanism is employed, any suitable device, for example a coil spring or a leaf spring, may be used. In addition, collar 74 may be secured to body 16 through any suitable mechanism such as a keyed engagement or the like. Further, plate 66 could be molded to the driver housing or secured in any other suitable manner or the locking mechanism could be adapted to engage an existing portion of a driver. These and other modifications and variations to the present invention may be practiced by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is provided by way of example only, and is not intended to be limitative of the invention so further described in such appended claims.

What is claimed is:

1. A chuck for use with a manual or powered driver having a housing and a drive shaft rotatable with respect to said housing, said chuck comprising:

a generally cylindrical body, said body having a forward section and a rearward section, said rearward section having an axial bore formed therein to mate with said drive shaft of said driver;

a generally cylindrical sleeve being received over said body so that said sleeve is rotatable relative to said body;

a gripping mechanism actuatable to a closed position in which said gripping mechanism axially and rotationally retains a tool with respect to said body and to an open position in which said gripping mechanism does not so retain a tool, said gripping mechanism being in communication with said body and said sleeve so that relative rotation between said body and said sleeve actuates said gripping mechanism to one of said closed position and said open position, depending on the direction of said relative rotation between said body and said sleeve; and a locking member mounted on said body so that said locking member is rotationally fixed to said body and is movable from a first position in which said locking member is rotatable with respect to said housing to a second position in which said locking member is rotationally fixed to said housing, said locking member being in communication with a compressible portion of said sleeve so that compression of said sleeve portion moves said looking member from said first position to said second position.

2. The chuck as in claim 1, including a biasing mechanism biasing said locking member to said first position.

3. The chuck as in claim 2, wherein said biasing mechanism is in operative communication with said sleeve so that radially inward pressure on said sleeve is exerted against said biasing of said locking member.

4. The chuck as in claim 1, wherein said locking member includes an elongated arm.

5. The chuck as in claim 2, wherein said locking member includes a first portion substantially radially aligned, in said first position, with respect to said body and a second portion proximate said sleeve portion so that radially inward pressure on said sleeve portion is transferred to said second portion, said locking member being pivotally attached with respect to said body between said first portion and said second portion so that said radially inward pressure pivots said locking member to extend said first portion toward said housing.

6. The chuck as in claim 2, wherein said biasing mechanism includes a spring.

7. The chuck as in claim 6, wherein said spring is a compression spring.

8. The chuck as in claim 1, including a plurality of said locking members.

9. The chuck as in claim 5, including a plurality of said locking members disposed equidistantly about said body.

10. The chuck as in claim 1, including a collar attached to said rearward section of said body, wherein said locking member is attached to said collar.

11. The chuck as in claim 5, including an annular collar attached to said rearward section of said body, wherein said locking member is pivotally attached to said collar radially outward from said body.

12. The chuck as in claim 10, including a plurality of said locking members pivotally attached to, and equidistantly about, said collar.

13. The chuck as in claim 1, wherein an axial bore and a plurality of angularly disposed passageways are formed in said forward section of said body and wherein said gripping mechanism includes a plurality of jaws slidably positioned in each of said angularly disposed passageways.

14. The chuck as in claim 5, wherein said biasing mechanism includes a spring in communication with said second portion and disposed in a radially compressible position with respect to said body so that said spring biases said second portion radially outward from said body toward said sleeve to maintain said locking member in said first position.

15. The chuck as in claim 1, wherein said sleeve comprises a unitary sleeve extending over said forward section and said rearward section of said body.

16. The chuck as in claim 1, including an engagement member fixed to said housing, said engagement member defining at least one gap to receive said locking member, said gap having sides to prevent rotational movement of said locking member in said second position with respect to said housing.

17. A chuck for use with a manual or powered driver having a housing and a drive shaft rotatable with respect to said housing, said chuck comprising:

a generally cylindrical body, said body having a forward section and a rearward section rotationally fixed to said forward section, said rearward section having an axial bore formed therein to mate with said drive shaft of said driver and said forward section having an axial bore formed therein and a plurality of angularly disposed passageways formed therethrough and intersecting said axial bore in said forward section;

a plurality of jaws, wherein each of said jaws is slidably positioned in a respective one of each of said angularly disposed passageways and has a jaw face formed on one side thereof and threads formed on the opposite side thereof;

a nut rotatably mounted relative to said body so as to engage said jaw threads;

a generally cylindrical sleeve being received over said body so that said sleeve is rotatable relative to said body, said sleeve engaging said nut so that when said sleeve is rotated, said nut is rotated therewith to operate said jaws; and a locking mechanism configured to selectively rotationally fix said body to said housing so that relative rotation between said body and said housing is prevented while said sleeve is rotated relative to said body.

18. The chuck as in claim 17, wherein said locking mechanism includes a locking member rotationally fixed with respect to said body and selectively extendable from said body to engage said housing to rotationally fix said body with respect to said housing.

19. The chuck as in claim 18, wherein said locking member is in operative communication with said sleeve so that radially inward pressure on said sleeve extends said locking member toward said housing.

20. The chuck as in claim 19, wherein said locking member includes a first portion substantially radially aligned, in a retracted position, with respect to said body and a second portion proximate said sleeve so that radially inward pressure on said sleeve is transferred to said second portion, said locking member being pivotally attached with respect to said body between said first portion and said second portion so that said radially inward pressure pivots said locking member to extend said first portion toward said housing, and wherein said locking mechanism includes a spring in communication with said second portion and disposed in a radially compressible position with respect to said body so that said spring biases said second portion radially outward from said body toward said sleeve to maintain said locking member in said retracted position.

21. The chuck as in claim 20, including an annular collar attached to said rearward section of said body, wherein said locking member is pivotally attached to said collar radially outward from said body.

22. The chuck as in claim 17, wherein said sleeve comprises a unitary sleeve extending over said forward section and said rearward section of said body.

23. A chuck for use with a manual or powered driver having a housing and a drive shaft rotatable with respect to said housing, said chuck comprising:

a generally cylindrical body, said body having a forward section and a rearward section rotationally fixed to said forward section, said rearward section having an axial bore formed therein to mate with said drive shaft of said driver and said forward section having an axial bore formed therein and a plurality of angularly disposed passageways formed therethrough and intersecting said axial bore in said forward section;

a plurality of jaws, wherein each said jaw is slidably positioned in a respective one of each of said angularly disposed passageways and has a jaw face formed on one side thereof and threads formed on the opposite side thereof;

a nut rotatably mounted relative to said body so as to engage said jaw threads;

a generally cylindrical unitary sleeve being received over said forward section and said rearward section of said body so that said sleeve is rotatable relative to said body, said sleeve engaging said nut so that when said sleeve is rotated, said nut is rotated therewith to operate said jaws;

an annular collar attached to said rearward section of said body;

an extendable locking member pivotally attached to said annular collar in a rotationally fixed position with respect to said body and including a first portion substantially radially aligned, in a retracted position, with respect to said body and a second portion proximate said sleeve so that radially inward pressure on said sleeve is transferred to said second portion, said locking member being pivotally attached to said annular collar between said first portion and said second portion so that said radially inward pressure pivots said locking member to extend said first portion toward said housing to engage said housing to rotationally fix said body with respect to said housing so that relative rotation between said body and said housing is prevented while said sleeve is rotated relative to said body; and a spring in communication with said second portion so that said spring biases said second portion radially outward from said body toward said sleeve to maintain said locking member in said retracted position.

24. The chuck as in claim 23, including a plurality of said locking members disposed equidistantly about said collar.

25. The chuck as in claim 23, wherein said collar is pressed to said rearward section of said body.

26. A manual or powered driver, said driver comprising:
a housing;
a drive shaft rotatable with respect to said housing; and
a chuck, said chuck including
a generally cylindrical body, said body having a forward section and a rearward section, said rearward section having an axial bore formed therein to mate with said drive shaft of said driver,
a generally cylindrical sleeve being received over said body so that said sleeve is rotatable relative to said body,
a gripping mechanism actuatable to a closed position in which said gripping mechanism axially and rotationally retains a tool with respect to said body and to an open position in which said gripping mechanism does not so retain a tool, said gripping mechanism being in communication with said body and said sleeve so that relative rotation between said body and said sleeve actuates said gripping mechanism to one of said closed position and said open position, depending on the direction of said relative rotation between said body and said sleeve, and
a locking member mounted on said body so that said locking member is rotationally fixed to said body and is movable from a first position in which said locking member is rotatable with resect to said housing to a second position in which said locking member is rotationally fixed to said housing, said locking member being in communication with a compressible portion of said sleeve so that compression of said sleeve portion moves said locking member from said first position to said second position.

27. The driver as in claim 26, wherein said locking member is rotationally fixed with respect to said body and selectively extendable from said body to engage said housing to rotationally fix said body with respect to said housing.

28. The driver as in claim 27, wherein said locking member is pivotally attached with respect to said body and includes a first portion substantially radially aligned, in a retracted position, with respect to said body and a second portion proximate said sleeve so that radially inward pressure on said sleeve is transferred to said second portion, thereby pivoting said locking member to extend said first portion toward said housing to engage said housing to rotationally fix said body with respect to said housing so that relative rotation between said body and said housing is prevented while said sleeve is rotated relative to said body, wherein said chuck includes a spring in communication with said second portion so that said spring biases said second portion radially outward from said body toward said sleeve to maintain said locking member in said retracted position, and wherein said sleeve comprises a unitary sleeve extending over said forward section and said rearward section of said body.

29. The driver as in claim 28, including an annular collar attached to said rearward section of said body, wherein said locking member is pivotally attached to said collar radially outward from said body and wherein said spring is disposed between said body and said second portion.

30. The driver as in claim 27, wherein said locking mechanism includes an engagement member fixed to said housing, said engagement member defining at least one gap to receive said locking member, said gap having sides to prevent rotational movement of said locking member with respect to said housing.

31. A chuck for use with a manual or powered driver having a housing and a drive shaft rotatable with respect to said housing, said chuck comprising:
a generally cylindrical body, said body having a forward section and a rearward section, said rearward section having an axial bore formed therein to mate with said drive shaft of said driver;
a generally cylindrical sleeve being received over said body so that said sleeve is rotatable relative to said body;
a gripping mechanism actuatable to a closed position in which said gripping mechanism axially and rotationally retains a tool with respect to said body and to an open position in which said gripping mechanism does not so retain a tool, said gripping mechanism being in communication with said body and said sleeve so that relative rotation between said body and said sleeve actuates said gripping mechanism to one of said closed position and said open position, depending on the direction of said relative rotation between said body and said sleeve; and
a locking member rotationally fixed to said body and pivotally attached to said body so that said locking member is pivotable between a first position in which said locking member is rotatable with respect to said housing and a second position in which said locking member is rotationally fixed to said housing.

32. A chuck for use with a manual or powered driver having a housing and a drive shaft rotatable with respect to said housing, said chuck comprising:
a generally cylindrical body, said body having a forward section and a rearward section rotationally fixed to said forward section, said rearward section having an axial bore formed therein to mate with said drive shaft of said driver and said forward section having an axial bore formed therein and a plurality of angularly disposed passageways formed therethrough and intersecting said axial bore in said forward section;
a plurality of jaws, wherein each said jaw is slidably positioned in a respective one of each of said angularly disposed passageways and has a jaw face formed on one side thereof and threads formed on the opposite side thereof;
a nut rotatably mounted relative to said body so as to engage said jaw threads; and
a locking member rotationally fixed to said body and pivotally attached to said body so that said locking member is pivotable between a first position in which said locking member is rotatable with respect to said housing and a second position in which said locking member is rotationally fixed to said housing.

* * * * *